United States Patent [19]
Kline et al.
[11] 3,800,170
[45] Mar. 26, 1974

[54] LOW POWER DISSIPATION HIGH VOLTAGE CRYSTAL DRIVER

[75] Inventors: Norman D. Kline; Russell J. Weinschenk, both of Rochester, Minn.
[73] Assignee: International Business Machines Corporation, Armonk, N.Y.

[22] Filed: Mar. 16, 1973
[21] Appl. No.: 342,108

[52] U.S. Cl. .................. 310/8.1, 307/252, 307/305, 315/238, 315/241, 318/116
[51] Int. Cl. .......................................... H04r 17/00
[58] Field of Search ....... 310/8.1, 26; 318/116, 118; 307/252, 305; 315/238, 241

[56] References Cited

UNITED STATES PATENTS

| | | | |
|---|---|---|---|
| 2,651,012 | 9/1953 | Valkenburg et al. | 318/116 |
| 3,436,514 | 4/1969 | Broomhall et al. | 307/252 X |
| 3,573,781 | 4/1971 | Shoh | 310/8.1 X |
| 3,614,486 | 10/1971 | Smiley | 310/8.1 X |
| 3,638,087 | 1/1972 | Ratcliff | 310/8.1 X |
| 3,683,212 | 8/1972 | Zoltan | 310/8.1 X |
| 3,740,582 | 6/1973 | McCusker et al. | 310/8.1 X |

*Primary Examiner*—J. D. Miller
*Assistant Examiner*—Mark O. Budd
*Attorney, Agent, or Firm*—Donald F. Voss

[57] ABSTRACT

A high voltage crystal driver is operated by a control pulse having a predetermined repetition rate which fires a first singleshot multivibrator to turn on a first silicon controlled rectifier (SCR) to charge the crystal. A resistor in the anode circuit of the SCR limits the dv/dt and sets the maximum current in the first SCR. The pulse width of the control pulse is greater than the period of the first singleshot multivibrator and the fall of the control pulse is used to fire a second singleshot multivibrator which turns on a second SCR to provide a discharge path for the crystal. A resistor connected in the anode circuit of the second SCR limits the current therein and the dv/dt.

5 Claims, 3 Drawing Figures

LOW POWER DISSIPATION HIGH VOLTAGE CRYSTAL DRIVER

BACKGROUND OF THE INVENTION

1. Field of the Invention

This invention relates to a high voltage crystal driver circuit and more particularly such a driver circuit having low power dissipation and still more particularly to such a driver circuit which provides a high voltage transfer to the crystal with relatively small rise and fall times.

Crystals such as piezoelectric crystals are useful as electro-mechanical actuators for high speed printers and similar devices. In these type of machines, particularly in view of the number of actuators required, it is desired to keep power losses to a minimum. It is also desirable to operate the crystals at a high repetition rate. The high voltage crystal driver of the present invention is thus particularly suitable for high speed printers.

2. Prior Art

In the past it has been the practice to use a transistor and a resistor, capacitor and diode network to control the transfer of voltage to the crystal. A control pulse turns the transistor on and the charge of the capacitor transfers very rapidly to the crystal. The fall of the control pulse turns the transistor off and in turn discharges the crystal. In order to keep the discharge time small, the resistor in the circuit ideally should have a low value. However, to limit power dissipation, a high value resistor is required. These two requirements are in conflict with each other and at best a compromise can be made. It should be noted that although the charge transfers very rapidly from the capacitor to the crystal, when the transistor turns on, the transistor is on for the entire length of the control pulse and thus the resistor is dissipating power for that period of time.

In the present invention, the devices for controlling the charging and discharging of the crystal are on only for a time equal to the charge and discharge time of the crystal so as to minimize power dissipation. The charging and discharging of the crystal is controlled separately and thus the on time of the control devices can be limited to the charge and discharge time of the crystal which can be kept quite small by use of low value resistors.

Even though the resistors are of low value, power dissipation is minimal because the SCR's are on for only a short period of time. Hence, not only is the circuit capable of operating at a relatively high repetition rate, its power supply requirements are minimal.

SUMMARY

The principal objects of this invention are to provide an improved high voltage crystal driver which: (*a*) operates at relatively high repetition rates; (*b*) is relatively inexpensive; (*c*) has minimal power dissipation and power supply requirements; and (*d*) can be easily packaged.

These objects are achieved by separately controlling the charging and discharging of the crystal and limiting the on time of the control devices to the charge and discharge time of the crystal which is kept small by use of low value resistors in the circuits of the control devices.

DESCRIPTION

Figure 1:
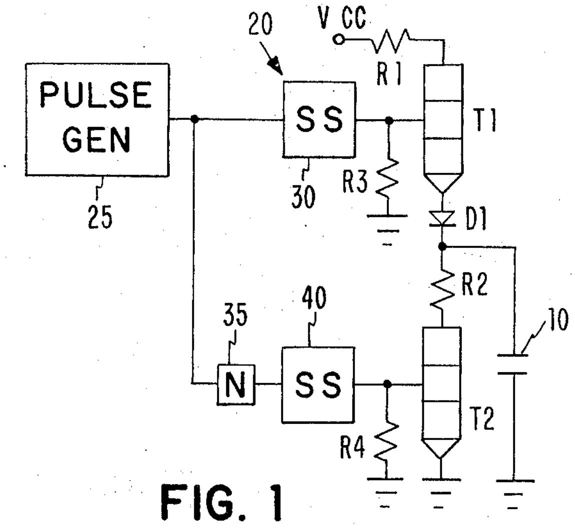
FIG. 1 is a schematic circuit diagram illustrating the invention.

With reference to the drawings and particularly to FIG. 1, the invention is shown by way of example as a circuit for repetitively charging and discharging crystal 10. Crystal 10 is piezoelectric crystal of the type well known in the art, and in this instance its function is to perform work by converting electrical energy to mechanical motion. Crystal 10 has an equivalent capacitance which is dependent upon the geometry of the crystal. The equivalent capacitance is defined by the following: $C = 8.85AK/T$ where A is area in square meters, K is material constant, T is thickness in meters and C is capacitance in pico farads.

Figure 3:
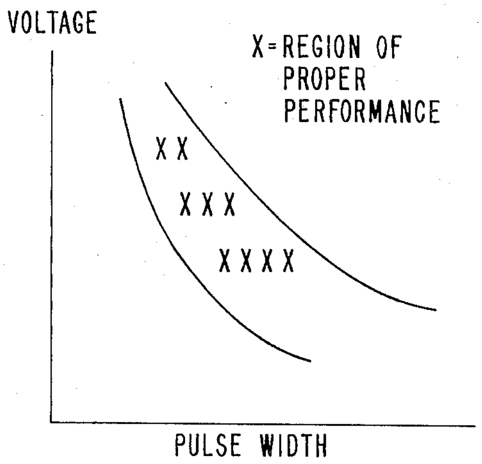
FIG. 2 is a waveform diagram and FIG. 3 is a voltage vs. pulse width diagram illustrating a band of voltages and pulse widths for proper performance of the invention when incorporated in an ink jet printer.

The high voltage crystal driver circuit 20 transfers the voltage to crystal 10 and then discharges crystal 10. The performance of crystal 10 as an electro-mechanical transducer is related to the voltage transfer to it and the resulting pulse width of the voltage pulse generated in response to charging and discharging crystal 10. This crystal voltage pulse is shown as waveform H in FIG. 2. By accurately controlling the pulse width, a range of voltages can be established for proper operation of the crystal as an electro-mechanical transducer. For example, the crystal may be incorporated into an ink jet printer and the crystal must be operated in such a fashion whereby the ink jet printer produces only a single drop of ink for each pulse. A band of voltages and pulse widths exists which results in proper performance as shown in FIG. 3.

Figure 2:
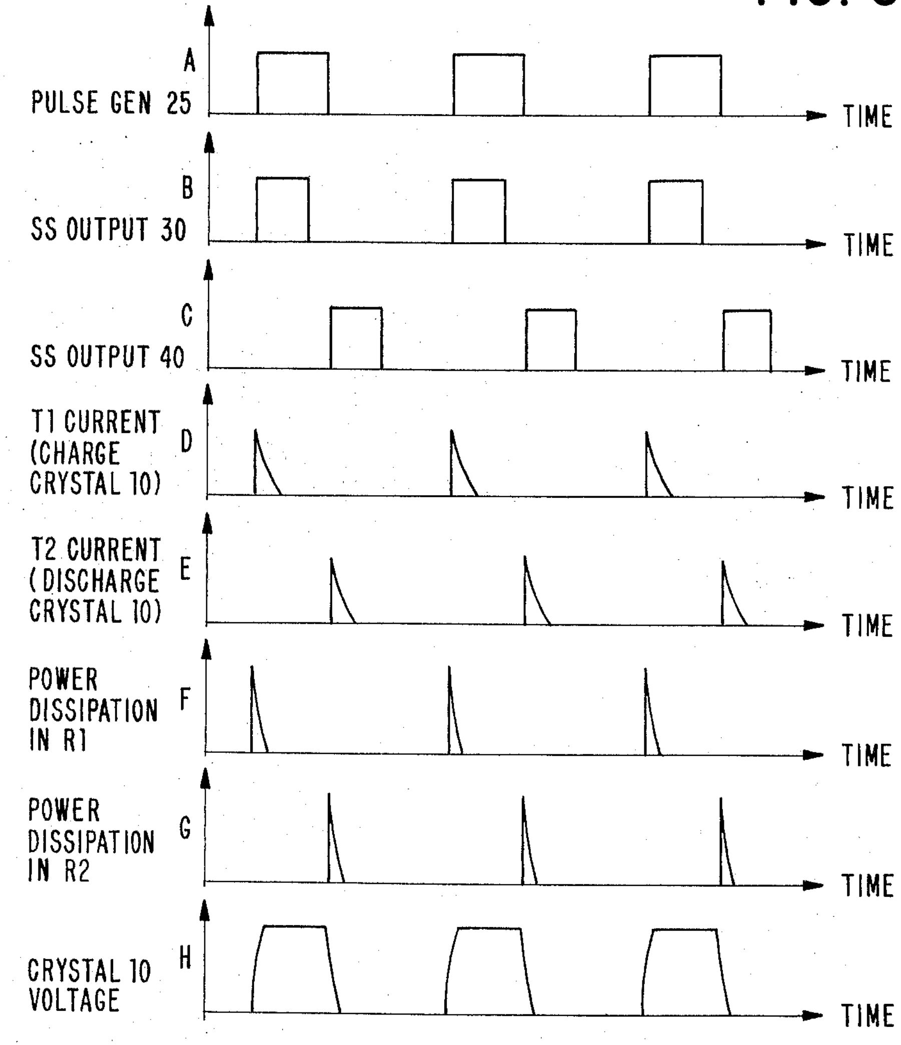

The high voltage crystal driver circuit 20 includes pulse generator 25 for providing control pulses shown as waveform A in FIG. 2. The control pulse is applied simultaneously to singleshot multivibrator 30 and to inverter 35. The leading edge of the control pulse fires first singleshot multivibrator 30 and its output signal is coupled to the gate of silicon controlled rectifier T1. The anode of T1 is connected to a source of positive potential Vcc via resistor R1 and the cathode is connected to crystal 10 via diode D1. The value of voltage source Vcc can vary depending upon the crystal used and other circuit parameters.

The output signal of singleshot multivibrator 30 is shown as waveform B in FIG. 2 and it renders the gate of T1 positive so as to turn T1 on. However, silicon controlled rectifier T2 which has its anode connected to the cathode of T1 via resistor R2 and diode D1 does not turn on at this time because its gate is substantially at ground potential and its dv/dt rating is sufficiently high so that when T1 turns on, T2 does not turn on.

With T1 on, crystal 10 charges to approximately the voltage of Vc. The charge path is from the source Vcc via resistor R1, silicon controlled rectifier T1, diode D1, crystal 10 to ground potential.

The time constant of the RC network formed by resistor R1 and crystal 10 is such as to permit silicon controlled rectifier T1 to turn on. However, when crystal 10 becomes fully charged, the current flowing in T1 falls below the value necessary to maintain conduction and T1 turns off. Resistor R3 which is connected to the gate of T1 holds the gate at ground potential and enables T1 to withstand a higher dv/dt than if the gate were floating. Diode D1 protects the gate of T1 against the relatively high anode voltage of T1.

The control pulse from generator 25 has a duration longer than the period of singleshot multivibrator 30, and its trailing edge is inverted by inverter 35 to fire singleshot multivibrator 40. The output signal from singleshot multivibrator 40 shown as waveform C in FIG. 2 renders the gate of silicon controlled rectifier T2 sufficiently positive to turn T2 on. With T2 on, a discharge path is provided for crystal 10. This discharge path is from the upper side of crystal 10 via resistor R2, silicon controlled rectifier T2 to ground potential. When crystal 10 becomes discharged, the current flowing in T2 is insufficient to maintain T2 conductive. Thus T2 turns off when crystal 10 becomes discharged. When T2 is off, its gate is held at ground potential via resistor R4.

In this particular example, with a crystal having an equivalent capacitance of 0.0068 micro farads, resistors R1 and R2 each have a value of approximately 50 ohms. The voltage source Vcc is at approximately 225 volts. Resistors R3 and R4 each have a value of approximately 9K ohms. Pulse generator 25 provides a series of control pulses at a frequency of approximately 10K hertz. The width of the control pulse is approximately 8 microseconds, whereas the width of the pulses from singleshot multivibrators 30 and 40 is approximately 5 microseconds. The current flowing in T1 for charging crystal 10 rises very rapidly and decreases exponentially as shown in waveform D of FIG. 2. Similarly the current in T2 rises rapidly and then decreases exponentially as seen in waveform E of FIG. 2. The power dissipation in resistors R1 and R2 is shown in waveforms F and G respectively.

From the foregoing it is seen that silicon controlled rectifiers T1 and T2 are not on for the entire period of time of the control pulse shown in waveform A. Further, it is seen that T1 and T2 are on for periods of time corresponding to the charge and discharge times of crystal 10. Power dissipation is held to a minimum because of the relatively short on times of T1 and T2. The pulse width of the voltage pulse from crystal 10 is precisely controlled.

We claim:

1. A high voltage crystal driver circuit comprising a source of power supply potential, an electro-mechanical crystal transducer connected to one side of said source of power supply potential, a first silicon controlled rectifier having anode, cathode and gate elements with said cathode connected to said crystal to control the charging thereof, a first resistor connected between the other side of said power supply potential and said anode of said first silicon controlled rectifier whereby when said first-silicon controlled rectifier is turned on a charge path is provided for said crystal, a second silicon controlled rectifier having anode, cathode and gate elements with said cathode connected to the other side of said power supply, a second resistor connected between said anode of said second silicon controlled rectifier and said crystal whereby when said second silicon controlled rectifier is turned on a discharge path is provided for said crystal, a first single shot multivibrator connected to control the turn on of said first silicon controlled rectifier, a second single shot multivibrator connected to control the turn on of said second silicon controlled rectifier, and control means for firing said first and second single shot multibrators in a sequence whereby said first single shot multivibrator fires and times out before said second singleshot multivibrator is fired.

2. A high voltage crystal driver circuit comprising:

a source of power supply potential, an electromechanical crystal transducer connected to one side of said source of power supply potential, a pair of silicon controlled rectifiers connected to control the charging and discharging of said crystal, one silicon controlled rectifier upon being rendered conductive controls the charging of said crystal and turns off in response to said crystal becoming charged, the other silicon controlled rectifier upon being rendered conductive controls the discharge of said crystal and turns off in response to said crystal becoming discharged, a first single shot multivibrator connected to control the turn on of said one silicon controlled rectifier, a second single shot multivibrator connected to control the turn on of said other silicon controlled rectifier, means for providing repetitive control signals having a time duration longer than the time preiod of said first single shot multivibrator, means for applying said control signals to said first single shot multivibrator to fire the same coincident with the leading edge of said control signals and means for applying said control signals to said second single shot multivibrator to fire the same coincident with the trailing edge of said control signals.

3. The high voltage crystal driver circuit of claim 2 wherein said means for applying said control signals to said second single shot multivibrator includes an inverter.

4. The high voltage crystal driver circuit of claim 1 further comprising means for holding the gates of said first and second silicon controlled rectifiers to the potential of said one side of said power supply.

5. The high voltage crystal driver circuit of claim 4 wherein said means for holding the gates of said first and second silicon controlled rectifiers to the potential of said one side of said power supply include resistor networks.

* * * * *